US007477733B2

(12) United States Patent
Koch et al.

(10) Patent No.: US 7,477,733 B2
(45) Date of Patent: *Jan. 13, 2009

(54) SYSTEMS AND METHODS FOR INTELLIGENT THIRD-PARTY REDIRECTION OF AN INCOMING CALL VIA A DISPLAY-BASED COMMUNICATION CENTER

(75) Inventors: Robert A. Koch, Norcross, GA (US); Scott C. Holt, Decatur, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 897 days.

This patent is subject to a terminal disclaimer.

(21) Appl. No.: 10/700,647

(22) Filed: Nov. 5, 2003

(65) Prior Publication Data
US 2004/0114730 A1    Jun. 17, 2004

Related U.S. Application Data

(63) Continuation of application No. 10/020,938, filed on Dec. 19, 2001, now Pat. No. 6,668,049.

(51) Int. Cl.
*H04M 3/42* (2006.01)
*H04L 12/66* (2006.01)
(52) U.S. Cl. .............................. 379/211.02; 379/201.01; 379/201.04; 379/201.07; 379/201.08; 379/212.01; 370/352

(58) Field of Classification Search ............ 379/211.02, 379/201.01, 201.04, 201.07, 201.08, 212.01; 370/352, 356
See application file for complete search history.

(56) References Cited

U.S. PATENT DOCUMENTS

| 5,754,630 | A |   | 5/1998 | Srinivasan |
| 6,078,582 | A | * | 6/2000 | Curry et al. ................. 370/356 |
| 6,292,478 | B1 | * | 9/2001 | Farris ......................... 370/352 |
| 6,292,479 | B1 | * | 9/2001 | Bartholomew et al. ...... 370/352 |
| 2004/0213207 | A1 | * | 10/2004 | Silver et al. ................. 370/352 |

OTHER PUBLICATIONS

PCT International Search Report PCT/US02/39856. BellSouth Intellectual Property Corporation.

* cited by examiner

*Primary Examiner*—Thjuan K Addy
(74) *Attorney, Agent, or Firm*—Scott P. Zimmerman, PLLC (57) ABSTRACT

Systems and methods allowing a third-party to redirect a telephone call according to an intended call recipient's preferences are disclosed. Calls received at a switch for a subscriber are suspended while a query is sent via AIN or other data networks to a communications center device associated with the called party number. If the call is intended for another user of the subscriber's telephone, a third party, the actual recipient of the call notification may redirect the call to the intended user without directly interfacing with the calling party. The user may select one or more options provided to route the call according to predefined profile information provided by the intended call recipient.

41 Claims, 7 Drawing Sheets

| CALLER | RECIPIENT |
|---|---|
| 205-654-2022 | JOAN |
| 205-323-7155 | WILLIAM |
| 202-121-8899 | JOAN |
| 404-553-7676 | BILLY |
| UNKNOWN | JOAN |
| PRIVATE | JOAN |
| DEFAULT | GENERIC |

FIG. 5A

| RECIPIENT | DEFAULT REACH NUMBER |
|---|---|
| JOAN | 404-434-1234 |
| WILLIAM | 202-223-4545 |

FIG. 5B

| RECIPIENT | WORK CALLS | PERSONAL CALLS |
|---|---|---|
| JOAN | 404-434-1234 | 404-225-8888 |
| WILLIAM | 202-223-4545 | 202-223-4545 |

FIG. 5C

| RECIPIENT | CURRENT REACH NUMBER |
|---|---|
| JOAN | DEFAULT |
| WILLIAM | 404-223-7777 |
| BILLY | DEFAULT |

SYSTEMS AND METHODS FOR INTELLIGENT THIRD-PARTY REDIRECTION OF AN INCOMING CALL VIA A DISPLAY-BASED COMMUNICATION CENTER

This is a continuation of U.S. patent application Ser. No. 10/020,938, filed Dec. 19, 2001, now U.S. Pat. No. 6,668,049 which is herein incorporated by reference in its entirety.

BACKGROUND

1. Field of the Invention

The present invention relates generally to telecommunications systems, and more particularly to enhanced call processing for telephone calls in a public switch telephone network or for telephone calls in a packet-switched data network.

2. Background of the Invention

Telecommunications system users often use communications devices in a shared environment. For example, in a typical household and in some offices a single telephone line may be used by multiple parties. In such environments, when a caller calls the household or the office, the caller dials a commonly used telephone number with the intent of reaching only one of the individuals associated with the number. If the intended called party is not at the called location when the call arrives, an extra burden is placed on the caller, the answering party, and the intended called party. That is, the other users of the shared communications device may answer a call merely to inform the caller that the intended called party is not in. The answering party may further take a message from the caller, or provide additional information regarding the intended called party's whereabouts. If the caller is directed to another location where the intended called party might be reached, the caller must end the current communication and place another call to the other location. If the caller does not wish to make a subsequent call, the intended called party may have missed an important communication.

One way for reducing the burden for answering parties has been to use a caller identification (caller-id) display device to identify the calling party prior to answering a call. Caller-id devices only allow the answering party to screen for calls that may be intended for a user present in the household or office. That is, for example, if Dianne Carter (calling from her office number, 205-654-2022) is known to always (or primarily) wish to communicate with Joan, and Joan is not at home at the time of a call from Dianne, Joan's family may choose not answer the call. If the household has voicemail or an answering machine, Dianne could leave a message, but she would not be put into contact with Joan until some time later.

If Joan was expecting the call, but had to leave the house for some period of time, the family could answer the call and could inform Dianne that Joan can be reached on her mobile telephone. In this case, Dianne has to hang up the call and dial Joan's mobile phone number. Further, if Dianne does not have a convenient means of writing down the new telephone number, she may forget the new number or may fail to place the second call.

In another situation, Joan (the intended called party) may not want to provide Dianne (the calling party) with the alternate telephone number but still desires to receive Dianne's call even when Joan is out of the home or office. Using conventional systems and methods, a person at Joan's home or office may answer Dianne's call, prompt her for her telephone number, then call Joan and ask her to return Dianne's call. Again, this method places a burden on the answering party who must serve as an intermediary between the calling party and the intended called party. A burden is also placed on the intended called party who must place a new call to the caller.

A need therefore exists for systems and methods to allow the recipient party. (also referred to herein as "answering party") to redirect the call to the intended called party (also referred to herein as "called party") without having to interact with the caller (also referred to herein as "calling party") and without requiring any of the parties to place a subsequent call.

SUMMARY OF THE INVENTION

The present invention provides systems and methods of redirecting a telephone call to an intended recipient according to an instruction received from a recipient of a call notification related to the telephone call. The systems and methods include receiving the telephone call at a switch and suspending the telephone call at the switch in response to a trigger configured on a subscriber's line. A first query message including at least a calling party information and a called party information may be sent from the switch to a server system. In one embodiment, the switch may be a service switching point or a voice-over-data network switch. In another embodiment, the server system may be a service control point or an application server in communication with the switch.

The server system may look up a network address associated with a communications center according to the called party information received in the query from the switch. The server system may also look up the intended recipient in a database based at least in part on the called party information and the calling party information provided in the first query message.

Once the communications center address has been determined, the server may send a notification message the communications center. In an embodiment, the notification message may include at least the calling party information and the intended recipient information identified by the server. The server then may receive a response from the communications center to the server including call processing instructions transmitted by the call recipient. The server system may then send a response to the first query message back to the switch providing at least part of the call processing instructions. The switch then completes the telephone call according to the response from the server.

The call processing instructions may be determined in part based on other information identified by the server related to the calling party and the intended called party. The server may include one or more profiles that may be configured with call processing instructions received from a subscriber.

DETAILED DESCRIPTION OF THE INVENTION

Figure 1:
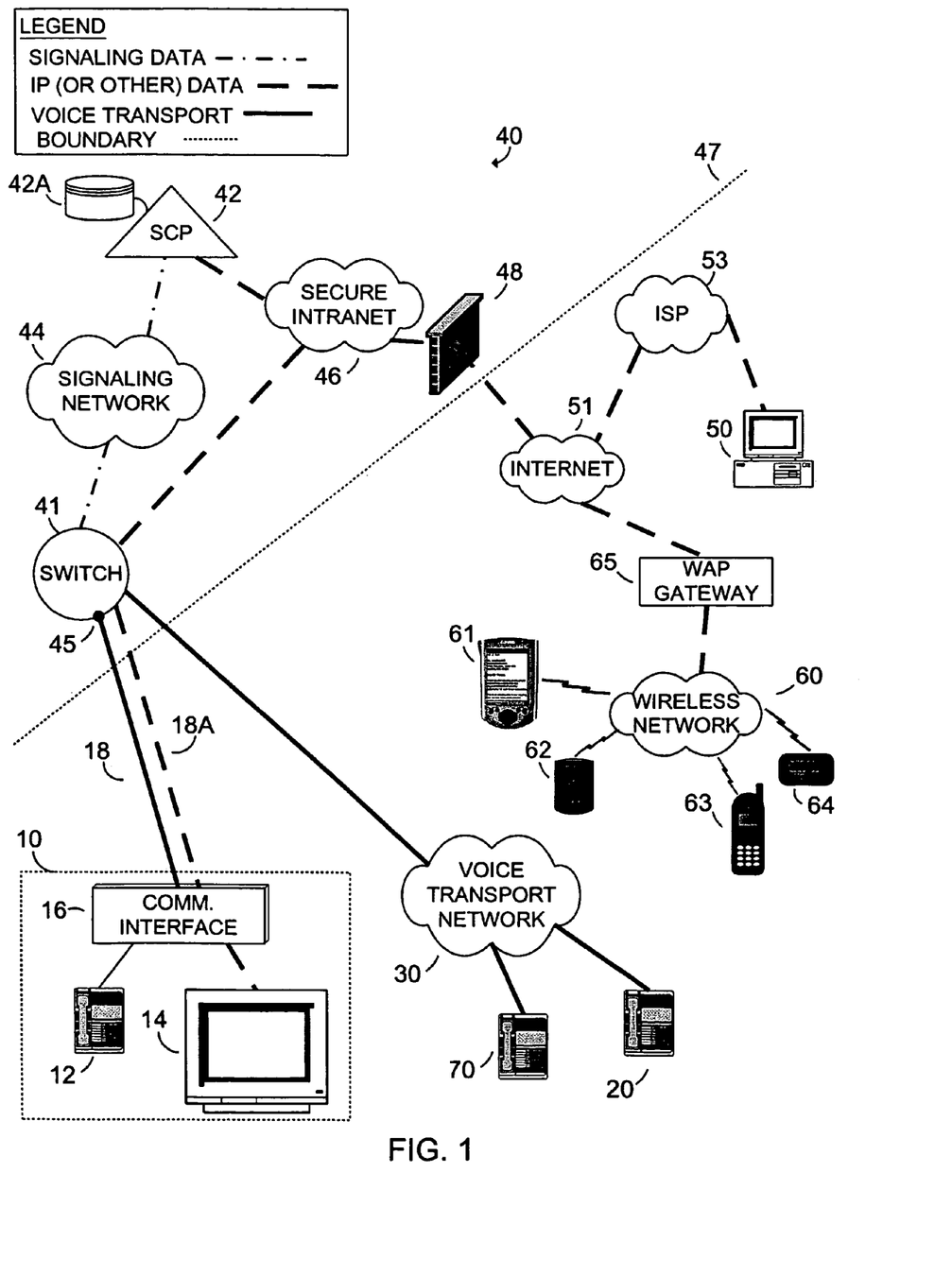
FIG. 1 is a schematic diagram of an architecture that may be used to implement an embodiment of the present invention.

FIG. 1 shows an architecture that may be used to implement an embodiment of the present invention. In FIG. 1, location 10 has telephone 12 and shared always-on communications center 14. Location 10 may represent the intended called party's home or office or other location where a calling party using, for example, telephone 20, may call to reach the intended called party. Telephone 20 may be a wireline telephone as shown in FIG. 1, or telephone 20 may be a wireless telephone, an Internet Protocol (IP) telephone, or another voice communication device. Voice transport network 30 may be a voice communications network such as the Public Switched Telephone Network (PSTN), wireless telephone networks, and packet-switched data networks configured to carry voice-grade communications. An example of a such a packet-switched data network includes an Internet Protocol (IP) network including voice-over-IP (VoIP) systems and applications.

Shared communications center 14 may be, for example, a broadband-enabled internet device, a personal computer (PC), a web television system a web appliance, or another device capable of communicating with telephone network 40. In an embodiment, communications center 14 may provide an enhanced caller-id interface, allowing the call recipient to interact with telephone network 40 to redirect incoming calls to a pre-defined number (e.g., Joan at work). Communications interface 16 may be a modem or other device configured to interface telephone network 40 with both voice telephone 12 and communications center 14 via one or more communications lines 18. For example, communications interface 16 may be a digital subscriber line (DSL) modem allowing broadband data transmission to and from communications center 14 and allowing voice calls to and from telephone 12 via single communications line 18. In FIG. 1, a data path to communications interface is identified as data communications path 18A. Data communications 18A may be transported over subscriber line 18 or may be transported over a different subscriber line. In another embodiment, communications line 18 is a television cable line, a wireless communications link, a satellite communications link, and so on.

Telephone network 40 may include switch 41, and service control point (SCP) 42. Switch 41 may be a service switching point (SSP) commonly used in advanced intelligent networks (AIN) in the PSTN. SCP 42 sends and receives signaling messages from switch 41 via signaling network 44. Signaling network 44 may be based on the well-known common channel signaling system number seven (SS7) protocol or another telephony signaling protocol. Switch 41 may be configured with trigger 45 associated with communications line 18 leading to location 10. Trigger 45 may be any suitable AIN trigger, for example, a termination attempt trigger.

In an embodiment of the present invention, calls may be routed according to information stored in a subscriber profile (e.g., correlating a list of frequent callers with the likely recipients at the subscriber's location), a recipient profile (e.g., containing a list of default reach number for one or more of the recipients), a persona profile (e.g., containing "Joan at work's" current reach number vs. "Joan at home's" current reach number), a presence profile (e.g., a database or file that is updated automatically by the network when it determines that a user has logged on to a system), or another subscriber-defined profile. The profiles may be stored in database 42A on SCP 42, or in another application or database server (not shown in FIG. 1). The profiles are described more fully in a later section. In one embodiment, the various profiles may be modified by the subscriber using, for example, an internet-capable access device, a menu-driven dual tone multi-frequency (DTMF) system telephone system and the like.

In an embodiment of the present invention, when a caller (using, for example, telephone 20) places a call to subscriber line 18 the call is routed from voice transport network 30 to switch 41 in telephone network 40. Boundary 47, separating telephone network 40 from other systems shown in FIG. 1, may be extended to include one or more of the other components shown in FIG. 1. That is, for example, voice transport network 30 may comprise part of telephone network 40 or may be a separate network as shown in FIG. 1. Similarly, switch 41 may be a switch in voice transport 30 (e.g., switch 41 may serve telephone 20 as well as line 18) or may be a switch separate from voice transport network 30 as shown in FIG. 1. When the call arrives at switch 41, trigger 45 on line 18 causes switch 41 to temporarily suspend call processing with respect to that call so the switch can determine proper call processing procedures.

While the call is suspended, switch 41 sends a query to SCP 42 requesting call processing instructions for the call. The query is sent from switch 41 to SCP 42 via signaling network 44. The query includes information that may identify the calling party and the called party. That is, for example, the query may include the called party number (CdPN) and the calling party number (CgPN). The call may remain suspended at switch 41 pending a response to the query. In an embodiment of the present invention, switch 41 may connect the call through to telephone device 12 if no response has been received within a pre-determined period of time. In another embodiment of the present invention, switch 41 may play an announcement to the caller to notify him that the called party is being located. In another embodiment of the present invention, switch 41 may route the call to a service node or other system configured to receive the call while the network locates the intended called party.

In response to the query from switch 41, application logic on SCP 42 operates to provide a call notification to communications center 14 and to receive call processing instructions from communications center 14. In one embodiment of the present invention SCP 42 may include all of the application logic and data needed to complete such transactions. In another embodiment, SCP 42 may work with an application server to retrieve data or other instructions that may be needed to complete the transactions. In another embodiment, SCP 42 may hand-off the function of completing the notification process and collecting call processing instructions to an application server. In the latter embodiment, SCP 42 send a message to the application server instructing it to determine subsequent call processing instructions. Each of these embodiments function in a similar manner. That is, a notification message is sent to communications center 14 with information associated with the call. In response to the message, communications 14 provides a visual and/or audible alert message to inform a user at location 10 that an incoming call has been received. Communications center 14 then collects call processing instructions from the user and sends a response message back to telephone network 40. The call is further processed by telephone network 40 based on the that response.

SCP Includes Application Logic for Completing Transactions

In this embodiment, SCP 42 includes application logic needed to complete the notification and call processing transactions in telephone network 40. As described above, SCP 42 receives a query message from SSP 41 that includes certain data related to the call such as the CgPN and CdPN information. SCP 42 may use the CgPN information to identify calling name and address information using conventional AIN protocols. Additionally, SCP 42 may collect other information related to the calling party. For example, a weather report or other information for the calling party's location may be retrieved from a web-sever (not shown in FIG. 1) or other server systems.

SCP 42 may use the CdPN information to identify an address associated with the called party (i.e., the subscriber). A database of subscriber directory numbers (DN) may be maintained in database 42A for correlating a subscriber's DN (i.e., a telephony network "address") with the subscriber's packet-switched network address. Once SCP 42 has determined the address for communications center 14 a notification message may be sent. The notification message may be transmitted via secure intranet 46 in telephone network 40. As shown in FIG. 1, a message sent from SCP 42 via secure intranet 46 may ultimately be passed through switch 41 to communications center 14 over data path 18A.

Figure 2:
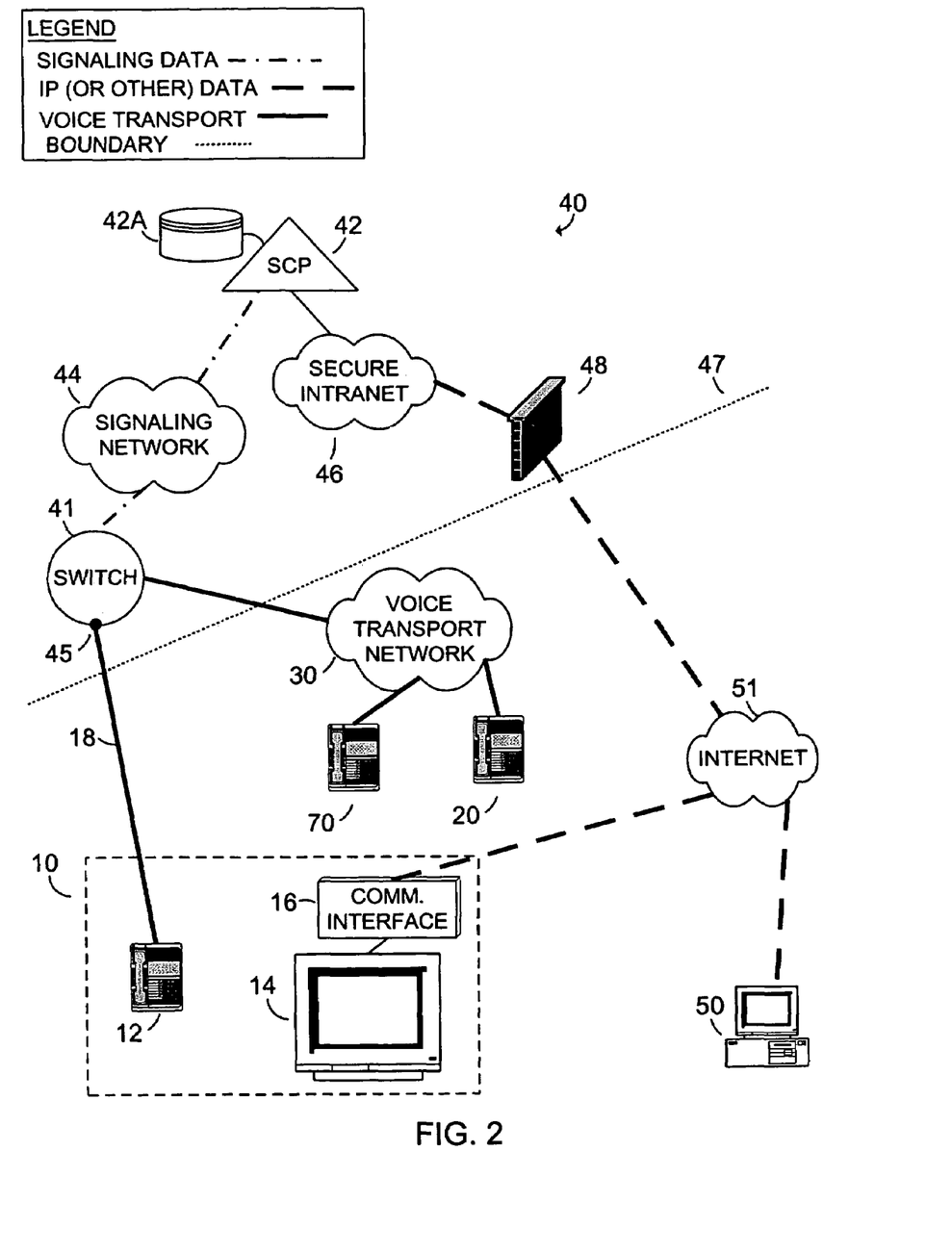
FIG. 2 is a schematic diagram of an architecture that may be used to implement another embodiment of the present invention.

In an alternative embodiment, shown in FIG. 2, the message from SCP 42 may be transmitted to communications center 14 via a data path including secure intranet 46, firewall 48, and Internet 51. In another alternative embodiment, also shown in FIG. 2, SCP 42 may send the notification message to computer 50 instead of or in addition to communications center 14. In this embodiment, a subscriber may issue call processing instructions from a remote location.

The contents of the notification message may include the calling name and address information and any external information (e.g., weather report) that may be associated with the calling party. The message may also include special call processing options based on any profile data established by the subscriber. The response from communications center 14 (and/or computer 50) in embodiments such as shown in FIG. 1 and 2 is essentially the same as with other embodiments shown in FIGS. 3-4, described below. Accordingly, the response and subsequent call processing are described in a later section.

Figure 3:
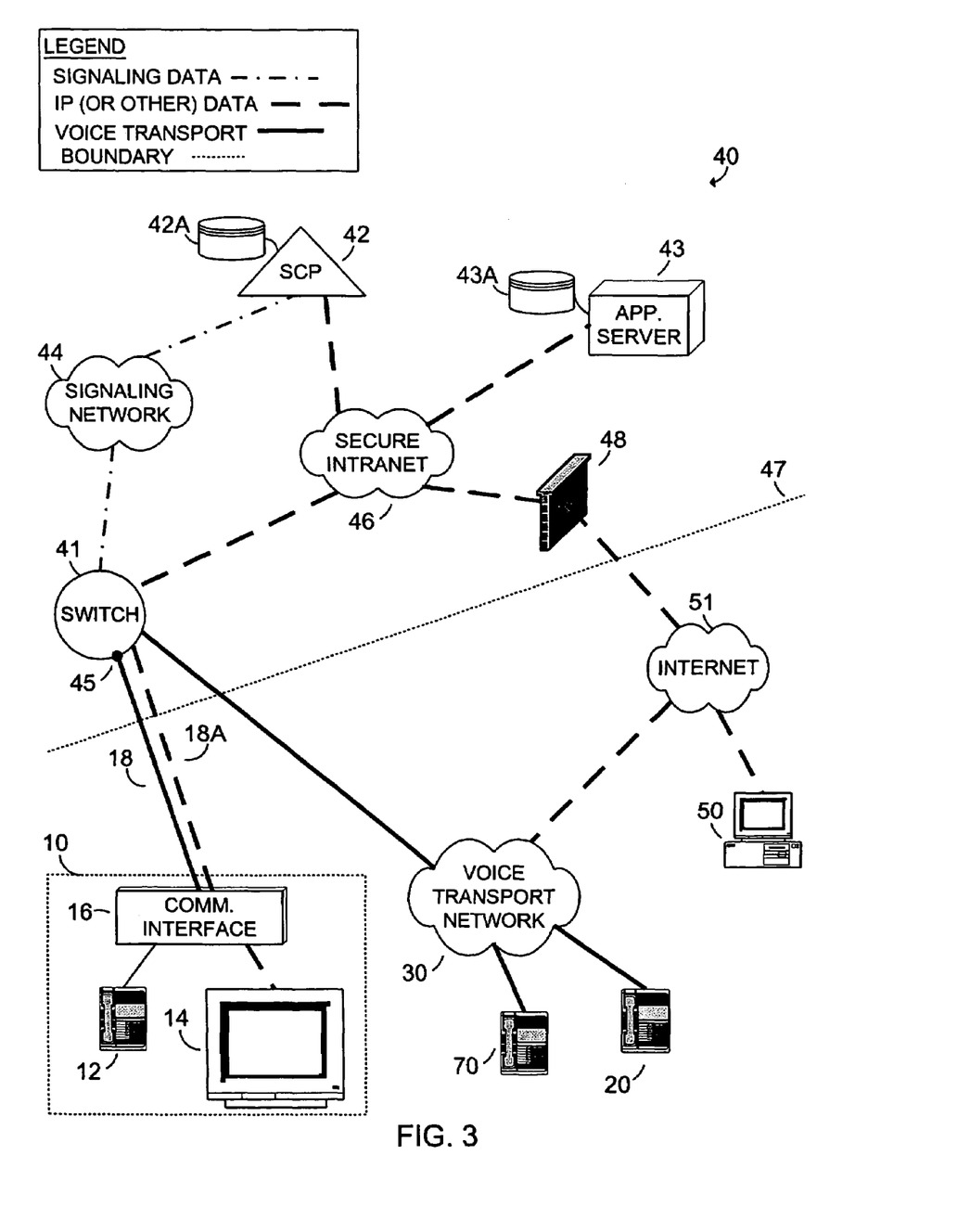
FIG. 3 is a schematic diagram of an architecture that may be used to implement another embodiment of the present invention.
Figure 4:
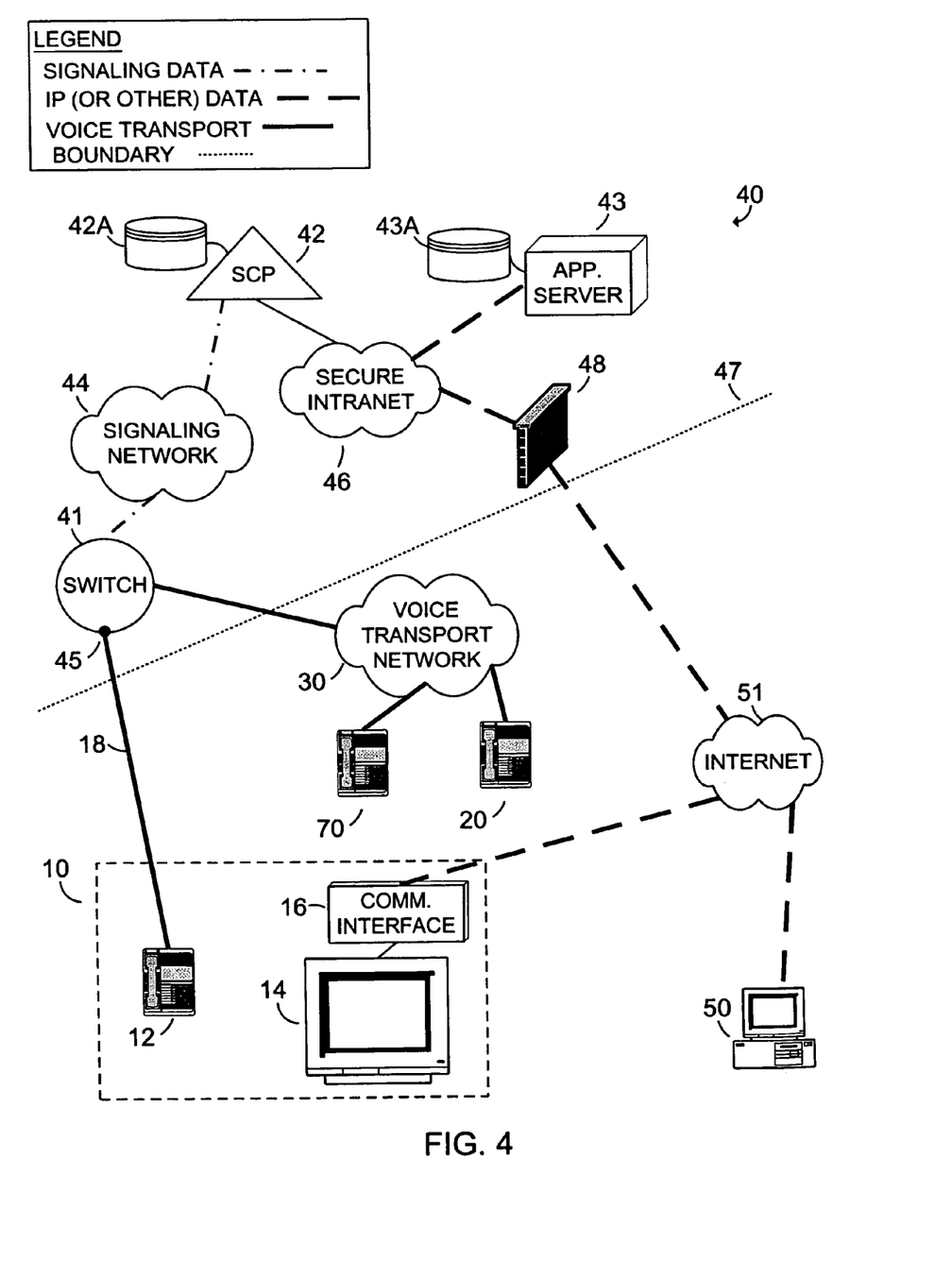
FIG. 4 is a schematic diagram of an architecture that may be used to implement another embodiment of the present invention.

SCP and Application Server Include Application Logic for Completing Transactions In some embodiments of the present invention, an application server may be used to provide at least a portion or all of the application logic for notifying the subscriber and for receiving the subscriber's call processing instructions. FIGS. 3 and 4 show two embodiments including application server 43 in telephone network 40. Application server 43 may be any suitable computer system that has a central processor, a memory and application processing logic. Application server 43 may include one or more databases 43A for implementing embodiments of the present invention. Such databases may be internal to application server 43 or may be another database system (not shown in the Figures).

In some embodiments including application server 43, SCP 42 may send a query to application server 43 to retrieve subscriber profile information and other information needed to complete the transactions. For example, SCP 42 may provide application server 43 with the CgPN and the CdPN information and wait for a response from application server 43 before sending a notification message to communications server 14. Application logic on application server 43 uses the CgPN and CdPN to formulate a response to SCP 42's query. The response may include a network address for communications center 14 and one or more call processing options based on any subscriber profile information that may be stored in database 43A on application server 43. SCP 42 may then send a notification message to communications center 14 as described above in connection with FIGS. 1 and 2. SCP 42 may then receive call processing instructions from the subscriber and complete the call as directed.

In other embodiments, SCP 42 may send a query message to application server 43 asking for call processing instructions. In such embodiments, SCP 42 waits for a response from application server 43 before responding the original query it received from switch 41. The message sent to application server 43 may include the CgPN and CdPN information as well as any other information collects by SCP 42. That is, for example, if SCP 42 collects calling name and calling address information based on the CgPN, this information may be included in the message sent to application server 43.

Application server 43 looks up the network address for communications center 14 in database 43A based on the CdPN information or other information received from SCP 42. The network address may be, for example, an IP address, if the underlying data network is an IP network, or a network domain name that may be translated into a network address. As described above, application server 42 may send a notification message to communications center 14 via secure intranet 46 and through switch 41. The contents and processing of the notification message are described in a later section.

FIG. 4 shows another alternative embodiment of the present invention including application server 43. In this embodiment, application server 43 may send the notification message to communication center 14 via secure intranet 46, firewall 48 and internet 51. Alternatively, application server 43 may send the notification to computer 50 instead of, or in addition to sending a message to communications center 14.

Calls Processed Using Voice-Over-Packet-Switched Data Networks

In further embodiments of the present invention, telephone network 40 may include systems and applications for processing voice calls over a packet-switched data network. FIGS. 1-4, already described above, may be used to illustrate an implementation of such embodiments, with the primary change being the capabilities of switch 41. In such embodiments, switch 41 may include call agent functionality configured to provide call processing for telephone calls in the packet-switched data network environment. For example, switch 41 may be a Call agent 204 may be a softswitch system, such as, for example, the Alcatel 1000 Multimedia Multiservice Exchange (available from Alcatel, Paris, France) and switches provided by other vendors including, for example, Lucent Technologies (Murray Hill, N.J.), Sonus Networks (Westford, Mass.), and the like. Call agent functions may also be provided via a media gateway controller, such as for example, the Cisco Media Gateway Controller (available from Cisco Systems, San Jose, Calif.), and the like.

In embodiments implemented in voice-over-packet-switched data networks, when a call is received at switch 41 trigger 45 causes switch 41 to temporarily suspend call processing. Trigger 45 may be a network-based trigger such as an IP-based trigger, for example, a terminating trigger event registered the switch. In response to the trigger, switch 41 may send queries to and receive responses from SCP 42 via signaling network 44. Alternatively, switch 41 may send queries to and receive responses from application server 43 via secure intranet 46. In some embodiments, of the present invention, switch 41 may send queries to and receive responses from SCP 42 via either signaling network 44 or secure intranet 46. In an IP-based calling environment, the query may include, for example, an IP address associated with the calling party and an IP address associated with the called party. In another packet-switched data network environment, the query may include other information, as needed to provide sufficient identification of the calling party and the called party.

Subscriber Profiles

As described herein, the subscriber may use one or more profiles that allow varying degrees of call processing for calls from pre-determined callers. The purpose of the profiles, if used, is to correlate callers with intended recipients and to provide a means for locating the intended call recipient in a manner consistent with the intended recipient's instructions. The information may be used to route the call to the intended recipient as directed by the actual recipient of the call (i.e., the person receiving a call notification at communications center 14 or computer 50).

Figure 5A:
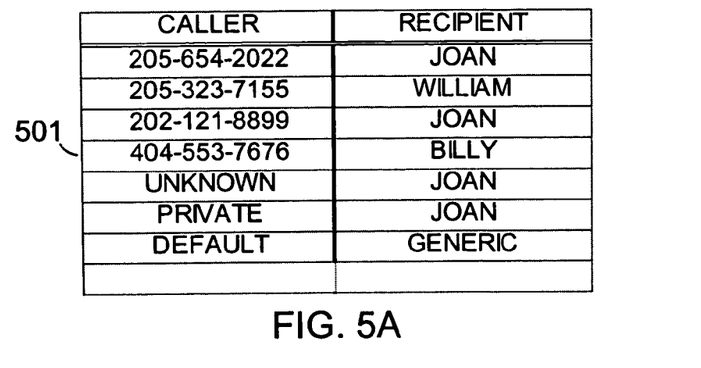
FIGS. 5A-5D are schematic diagrams illustrating various profiles that may be used in embodiments of the present invention to provide enhanced call routing options.

In an embodiment of the present invention, a subscriber may create a subscriber profile that correlates designated inbound calls with a particular member of the household (or office, when the present invention is implemented outside a household environment). An example of the information that may be included in a subscriber profile is shown in FIG. 5A. For example, in subscriber profile 501 the subscriber has determined that any calls from the directory number "202-654-2022" are likely intended for Joan, whereas calls from "404-553-7676" are for Billy. Similarly, in this example, the subscriber has determined that calls from unknown or private directory numbers will be handled by Joan. The subscriber has also determined that the default handling for calls not specifically identified in the subscriber profile at to be announced using a generic notification message.

Figure 5B:
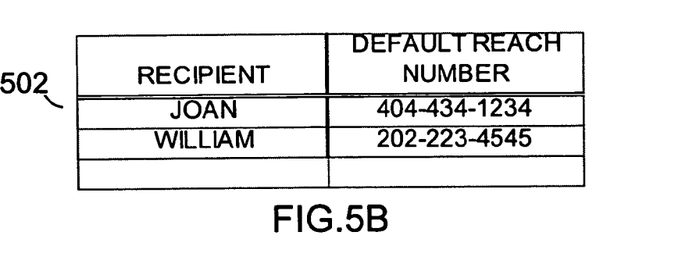

The subscriber may also establish one or more other profiles to provide more additional call processing options to the actual call recipient. Such profiles may be used, for example, to allow the call recipient to route the call directly to its intended recipient. For example, recipient profile 502, such as shown in FIG. 5B may be used to provide default reach numbers for one or more of the recipients. In this example, William and Joan have indicated that their default reach numbers are "202-223-4545" and "404-434-1234", respectively. This means that when a call intended for William reaches the system, for example, a call from "205-323-7155", the notification message sent from application server 43 (or SCP 42 in embodiments where the SCP includes all application processing logic) may include a field indicating that the call is intended for William and a field containing William's default reach number. Communications center 14 (or computer 50) may use this information to present one or more calling options to the call recipient as described in the next section.

Figure 5C:
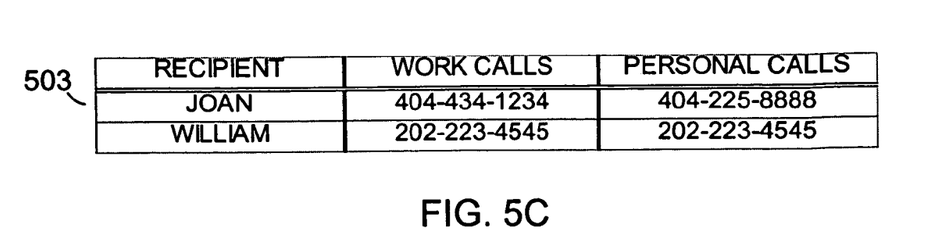

FIG. 5C shows another example of an additional profile that the subscriber may establish according to embodiments of the present invention. "Persona" profile 503, shown in FIG. 5C, may be used to define one or more call processing instructions associated with intended recipients based on the capacity in which the recipient is acting. For example, in the persona profile shown in FIG. 5C, Joan has included one telephone reach number for work-related calls and a different telephone reach number for personal calls. By including such persona profile information, the actual call recipient may further direct calls to Joan, depending on the caller's identity. For example, if a call from "Frank Smith" is received from telephone number 202-121-8899, the subscriber profile indicates that this call is intended for Joan. Further, the persona profile indicates that Joan has a work persona and a personal persona. This information may be transmitted to communications center 14 (or to computer 50) for use in a notification message as described in the next section.

Figure 5D:
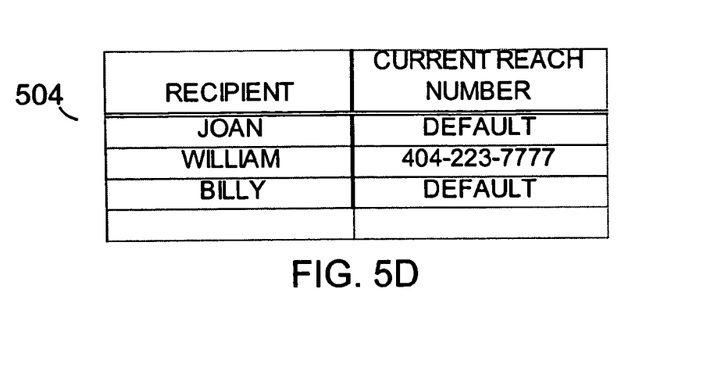

FIG. 5D shows another profile that may be used according to the present invention to assist the third-party call redirection according to the present invention. In this example, presence profile 504 may be updated automatically by the network when it determines that a user has logged on to a system. Use of a presence profile provides an option for the actual call recipient to direct the network to "find" the correct telephone number for redirecting a call to a particular user.

After determining the identity of the intended recipient, and any additional call processing options, a notification message is sent to communications center 14 (or to computer 50 in some embodiments). Communications center 14 (or computer 50) processes the notification message as described in the next section.

In embodiments of the present invention, a web interface or other user interface application may be provided to allow the user to update the information stored in the profiles. As shown in FIG. 1, application server 43 (or SCP 42) may be accessible via several platforms for ease of use by the users. For example, a user may update his information via a web browser application on computer system 50. Computer 50 may have a dial-up connection to Internet 51 (e.g., via Internet Service Provider (ISP) 53 or may have a direct connection to Internet 51 or may be attached to a local area network having connectivity to Internet 51. FIG. 1 also shows other means by which a user may update his profile information. For example, the user may update the information via wireless network 60, using for example, wireless application protocol (WAP) systems such as palmtop computer 61, personal digital assistant 62, wireless telephone 63 and interactive pager device 64. WAP devices typically connect to wireless network 60 via a WAP gateway 65 as shown in FIG. 1.

Subscriber Notification and Call Processing Instructions

Figure 6A:
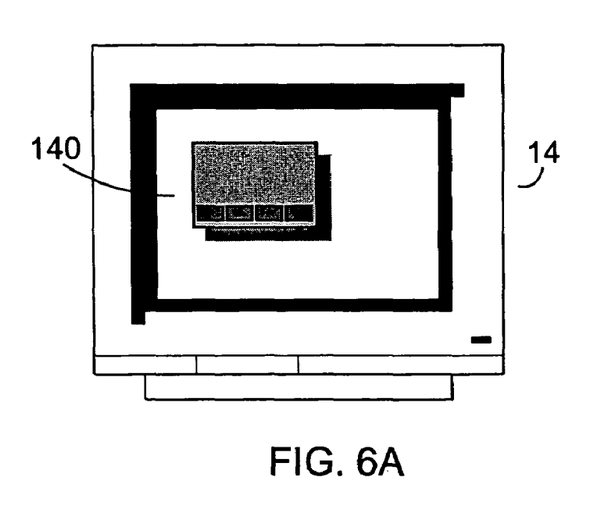
FIG. 6A is a schematic diagram showing how an always-on communications center may alert a user of an incoming call and provide an interface for redirecting the call to the intended recipient.
Figure 6B:
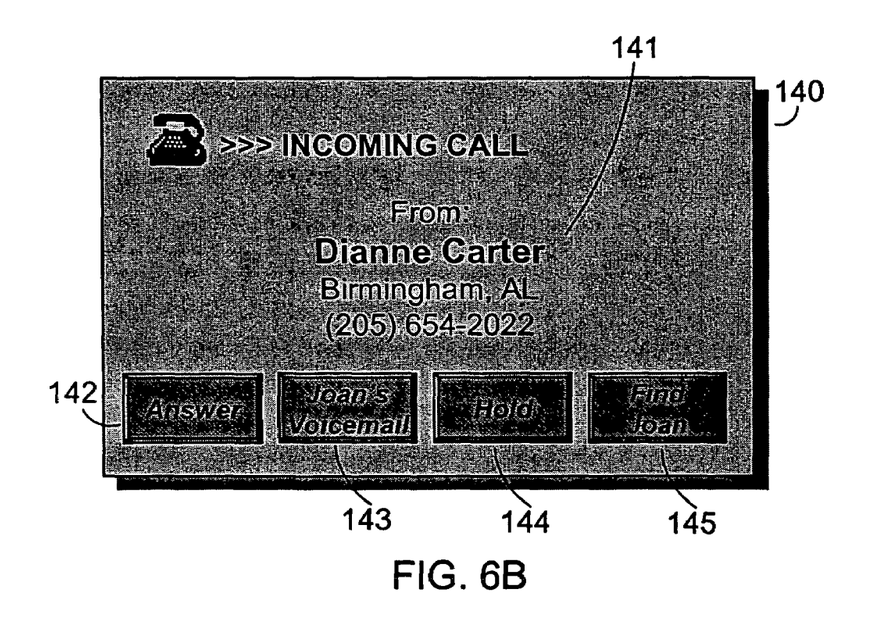
FIG. 6B is close-up view of a pop-up window that may be used as an interface for receiving call processing instructions from a call recipient.

As described above, communications center 14 (or computer 50) receives a call notification message from application server 43 (on in some embodiments from SCP 42). The notification message includes information about the calling party which may be obtained from standard calling name services or other database services correlating a calling party number (or IP address) with other data, such as, for example, an address, postal code, a weather report, or other information related to the caller's location or identity. When communications center 14 receives the caller information, it may provide a visible or audible alert that an incoming call is in progress. The alert may also be a combination of both audible and visual alerts. An example of a visual alert is shown in FIGS. 6A and 6B. FIG. 6A shows communications center 14 displaying pop-up window 140 providing information about the call. FIG. 6B is an enlarged view of pop-up window 140. As shown in FIG. 6B, pop-up window 140 includes caller-id information 141, and call processing option buttons 142-145. If communications center 14 receives input from the actual call recipient, a response message is sent back to application server 43 (or SCP 42). The response may be based on a call processing option selected by the recipient.

Examples of call processing instructions are shown in FIG. 6B. For example, a call recipient at location 10 may choose to answer the call by selecting option button 142 upon learning that the caller is "Dianne Carter" (as shown in FIG. 6B). If this option is selected, communications center 14 sends a message back to application server 43 (or SCP 42) indicating the call recipient's desire to receive the call at location 10. In this case, application server 43 (if an application server is used in the implementation) informs SCP 42 of the recipient's call processing instructions. SCP 42 then responds to switch 41's original query with an instruction to present the call. When the telephone rings, the recipient may lift the handset on telephone 12 at location 10. In embodiments wherein switch 41 is configured for voice-over-data networks, the call may be presented via a data path to communications center 14. In such embodiments, communications center 14 may comprise speakers and a microphone or other hardware and software allowing the recipient to receive the call through that device. Similarly, in embodiments wherein the notification message is transmitted to another computer system, such as, computer 50, switch 41 may establish a data session with that computer to present the call to the actual recipient.

As shown in FIG. 6B, other options may be provided via pop-up window 140. For example, if the recipient selects option button 143, the call is connected to a voice mail system without further intervention by the actual recipient. In one embodiment, the voice mail system may comprise a answering machine at location 10 (not shown in FIG. 1). The answering machine may be a standalone system or may be integrated with communication center 14. In this embodiment, the answering machine may comprise a single answering service, i.e., one that places all received calls into a single storage queue, or the answering machine may comprise a plurality of storage queues to delineate multiple users of the machine. For example, option button 143 may include a sub-option allowing the user to send the call to a specific user's voicemail system. In another embodiment, the voice mail system may comprise a centrally operated service such as may be provided through network 40. When the actual recipient selects option 143, communications center 14 routes the call to the answering machine and provides any special codes needed to route the call to the appropriate storage queue.

As shown in FIG. 6B, other option buttons may be included in pop-up display window 140. Option button 144 may be used to place the caller on hold. If this option is selected, communications center 14 (or computer 50) may send a message to application server 43 (or to SCP 42) instructing the system to play an announcement to the caller that to inform her that she is being placed on hold. Application server 43 relays the instruction to SCP 42 and SCP 42 sends a message to switch 41 directing it to play the appropriate announcement and directing it to continue waiting for some predetermined amount of time to receive another response from SCP 42.

After the recipient selects option button 144, notification window 140 may change its display to indicate the call is on hold. For example, the "Hold" option may become "grayed out" to indicate that option is no longer available. other visual or audible queues may also be provided, such as, for example, the window color may change or the window may flash on and off the screen as a reminder that a caller is on hold. When the recipient is ready to provide subsequent call processing instructions, he may select on of the other option buttons as described herein.

Another option provided on pop-up window 140 may be a request to locate the intended recipient and then connect the caller through to that person's telephone number. This option is shown as option button 145 in FIG. 6B. When SCP 42 or application server 43 receives the instruction to "Find Joan" or another user of communications line 18, a presence database (as shown in FIG. 5D) may be consulted to determine the intended recipient's current telephone number.

Still other options may be provided to the actual call recipient according to embodiments of the present invention. For example, an option to redirect a call according to a user's persona may be provided. In this example, a button such as "Send to Joan at Work" or "Send to Joan's Personal Telephone" may be provided. Furthermore, the specific layout of the notification message and the options provided to the actual call recipient may utilize any suitable style. For example, the notification message need not be displayed via a "pop-up" window. The notification may be provided via a text-based display system a graphical user interface or another system suitable for providing calling party information and call processing options and for receiving recipient instructions.

Furthermore, the option buttons may comprise one or more drop-down lists from which the recipient may select the call processing options for a particular call. For example, call recipient may wish to have the option to route the call to some user other than the "intended" user. That is, for example, an override system may be included. In this case, notification window 140 may include a drop-down list identifying all users listed in the subscriber profile.

Figure 7:
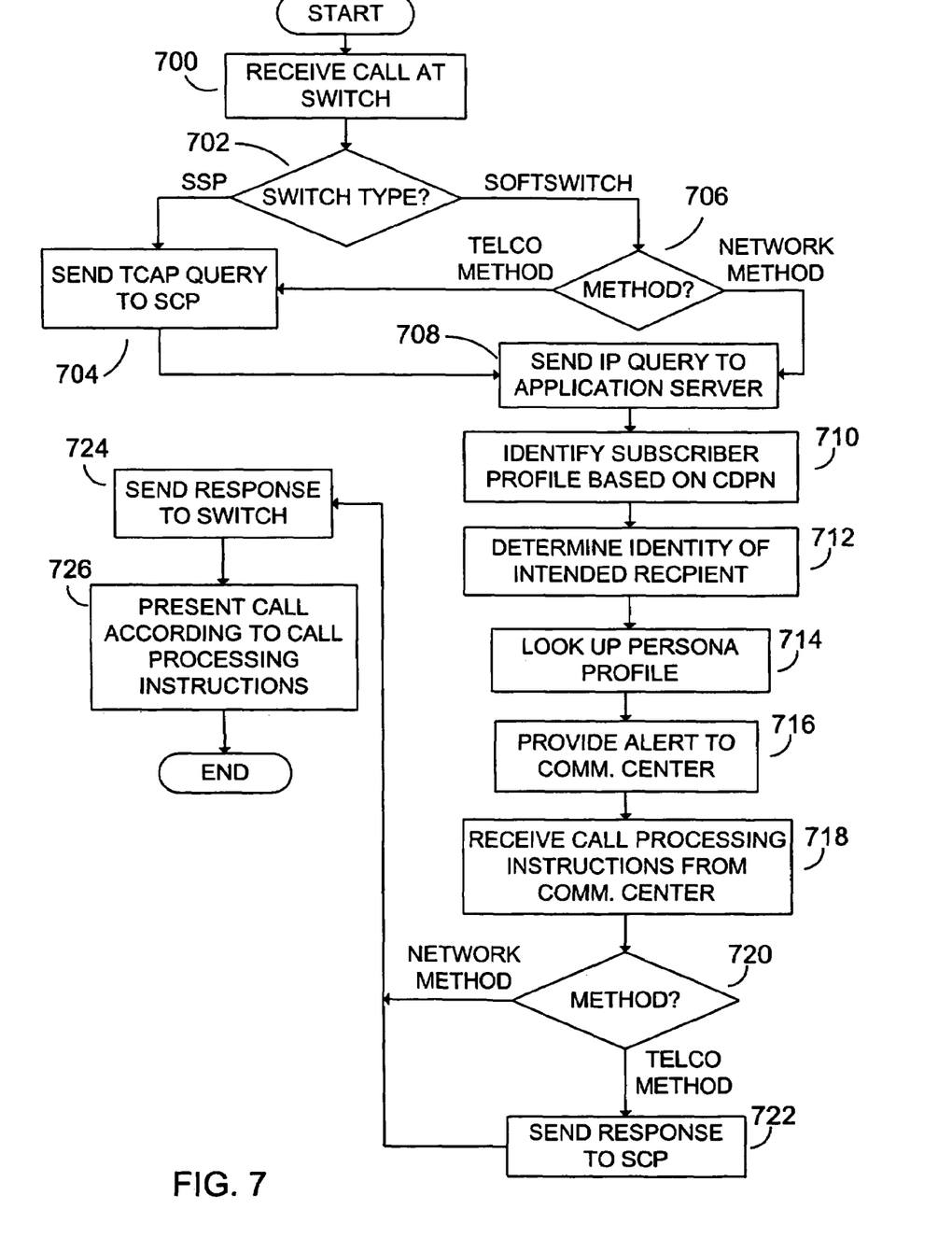
FIG. 7 is a flow diagram showing steps that may be used in embodiments of the present invention.

FIG. 7 is a generalized flow diagram showing steps that may be performed in some embodiments of the present invention. As described above, one or more of these steps may be carried out on different systems such as an SCP or an application server or both. In this example, the process starts with step 700 when a switch receives a call for the subscriber. A trigger on the switch is encountered causing the switch to suspend the call and initiate a query. As shown in step 702, the query issued may depend on the type of switch involved. For example, it the switch is an SSP, the query may sent to an SCP as an AIN query transmitted using the well-known transmission control application part (TCAP) protocol of SS7 as shown in step 704. From the SCP, a message may be transmitted to an application server for further processing using an IP message. Alternatively, if the switch is a softswitch (i.e., a switch configured for routing voice calls via a packet-switched data network) the query issued depends on the signaling method used to implement embodiments of the present invention as shown in step 706. If convention telephone network signaling ("telco" method) is used, the query issued may be transmitted to the SCP as a TCAP query, as shown in step 708. If a "network" method is used, the query may pass directly from the switch to an application server using an IP message, as shown in step 710.

As described above, the query message sent to the application server may include calling name information gathered by the SCP or by the application server using conventional calling name databases and queries. Accordingly, the query transmitted to the application server may include such information as the calling number, the calling name, a street address associated with the calling party and other information that may be presented to the call recipient, as well as the called party information. The application server may gather additional information from its own databases or may query other external database systems to collect more information regarding the calling party.

Using the information provided in the query, the application server identifies the identity of the subscriber in step 710. As described previously, this may entail looking up the called party number a database to identify a network address associated with a communications center. In step 712, the application server identifies the identity of the intended call recipient. This step may entail looking up the called party number and the calling party number in one or more databases to identify a the specific call processing options associated with the intended recipient as defined in one or more profiles. For example, in step 714, the application server may look to seek if a persona profile is associated with the intended call recipient.

In step 716, the application server sends a message to the communications center associated with the subscriber. Also in step 716, the communications center may display an alert for any user of the communications center. The alert may include the calling party information and provide call processing options. The user of the communications center becomes the "actual" recipient of the call by virtue of receiving the notification. However, in step 718, the recipient may provide call processing instructions via the communications center to the application server.

As shown in step 720, the next step may depend again on the signaling method employed in a specific embodiment. For example, if a telco method is used, the process may move on to step 722, wherein the application server sends a response to the SCP. Otherwise, if a network method is used, the application server may send its response direct to the switch in step 724. Once the switch receives the response, it processes the call in step 726 according to instructions received from the actual call recipient.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of redirecting a call to an intended recipient according to an instruction received from a recipient of a call notification related to the call, said method comprising:
   receiving the call;
   suspending processing of the call;
   querying a database for a calling number and a called number associated with the call;
   retrieving from the database a network address associated with the calling number and the called number;
   retrieving from the database an intended recipient of the call that is associated with the calling number and the called number, the database storing information regarding a plurality of potential call recipients associated with the called number;
   sending a notification message to the network address, said notification message including at least calling party information and an indication of the intended recipient;
   receiving a response from the network address, said response including a call processing instruction initiated by one of the plurality of potential call recipients; and
   completing the call according to the response.

2. The method of claim 1, further comprising sending a query message comprising the calling number and the called number associated with the call.

3. The method of claim 2, further comprising sending a query response based at least in part on the call processing instructions.

4. The method of claim 3, wherein the calling party information includes a calling party number, and wherein querying the database comprises querying a calling name database for a name associated with the called party number.

5. The method of claim 4, wherein retrieving the network address comprises looking up the called party number to determine an IP address associated with the called number.

6. The method of claim 1, wherein the calling party information includes an IP address associated with the calling number.

7. The method of claim 6, wherein retrieving the network address comprises looking up the IP address associated with the called number to determine a second IP address associated with the IP address associated with the called party.

8. The method of claim 1, further comprising:
   storing in a subscriber profile at least one record correlating the calling number with a particular user;
   checking the subscriber profile to identify a record corresponding to the calling party information; and
   including at least a portion of the identified record in the notification message.

9. The method of claim 8, further comprising:
   storing in a recipient profile at least one record correlating the particular user with a default reach number;
   checking the recipient profile to identify a second record corresponding to the particular user; and
   including at least a portion of the second identified record in the notification message.

10. The method of claim 9, further comprising:
    storing in a persona profile at least one record correlating the particular user with a plurality of reach numbers, said plurality of reach numbers categorized according to a plurality of roles defined by the particular user;
    checking the persona profile to identify a third record corresponding to the particular user; and
    including at least a portion of the third identified record in the notification message.

11. The method of claim 8, further comprising:
    storing in a persona profile at least one record correlating the particular user with a plurality of reach numbers, said plurality of reach numbers categorized according to a plurality of roles defined by the particular user;
    checking the persona profile to identify a second record corresponding to the particular user; and
    including at least a portion of the second identified record in the notification message.

12. The method of claim 8, further comprising:
    receiving registration information comprising an identity and a current reach number associated with a user;
    storing the registration information in a record in a presence profile;
    checking the presence profile to identify a second record corresponding to the particular user; and including at least a portion of the second identified record in the notification message.

13. The method of claim 1, further comprising causing display of an alert message at the network address that notifies a user of the suspended call, wherein said alert message includes at least a portion of the calling party information and the indication of the intended recipient.

14. A system for redirecting a telephone call to an intended recipient according to an instruction received from a recipient of a call notification related to the telephone call, said system comprising:
an application server communicating with a database, the application server receiving a query comprising a calling number and a called number, and wherein in response to the query the application server retrieves a network address associated with the calling number and the called number and retrieves an intended recipient of the call that is associated with the calling number and the called number, the database storing information regarding a plurality of potential call recipients associated with the called number, and wherein the application server sends a notification message to the network address, and wherein the application server receives call processing instructions from the network address initiated by one of the plurality of potential call recipients, and wherein in response to the call processing instructions, the application server sends a response message based at least in part on the call processing instructions, the response message providing instructions to complete the call according to the call processing instructions.

15. The system of claim 14, wherein the application server comprises a subscriber profile correlating a plurality of calling numbers with a plurality of potential call recipients, and wherein the notification message further includes an identity of the intended recipient based at least in part on the calling number.

16. The system of claim 15, wherein the application server further comprises a recipient profile correlating the potential call recipients with a default reach number, and wherein the notification message farther includes the default reach number based at least in part on the identity of the intended call recipient.

17. The system of claim 16, wherein the application server further comprises a persona profile correlating a potential call recipient with a plurality of reach numbers and associated categories, and wherein the notification message further includes the plurality of reach numbers and categories based at least in part on the identity of the intended call recipient.

18. The system of claim 17, wherein the application server further comprises a presence profile correlating a potential call recipient with a current reach number, and wherein the notification message further includes the current reach number based at least in part on the identity of the intended call recipient.

19. The system of claim 15, wherein the application server further comprises a persona profile correlating a potential call recipient with a plurality of reach numbers and associated categories, and wherein the notification message further includes the plurality of reach numbers and categories based at least in part on the identity of the intended call recipient.

20. The system of claim 19, wherein the application server further comprises a presence profile correlating a potential call recipient with a current reach number, and wherein the notification message further includes the current reach number based at least in part on the identity of the intended call recipient.

21. The system of claim 15, wherein the application server further comprises a persona profile correlating a potential call recipient with a plurality of reach numbers and associated categories, and wherein the notification message further includes the plurality of reach numbers and categories based at least in part on the identity of the intended call recipient.

22. The system of claim 15, wherein the application server further comprises a presence profile correlating a potential call recipient with a current reach number, and wherein the notification message further includes the current reach number based at least in part on the identity of the intended call recipient.

23. A system redirecting a call to an intended recipient according to an instruction received from a recipient of a call notification related to the call, said system comprising:
means for receiving a query comprising at least a calling party information and a called party information;
means for looking up a network address associated with the called party information;
means for looking up intended recipient information in a database according to the called party information and the calling party information, the database storing information regarding a plurality of potential call recipients associated with the called party information;
means for sending a notification message to the network address, said notification message including at least the calling party information and the intended recipient information;
means for receiving a response from the network address, said response including a call processing instruction initiated by one of a plurality of the potential call recipients; and
means for sending a processing response to the query, said processing response based at least in part on the call processing instructions.

24. The system of claim 23, further comprising means for receiving the call at a switch.

25. The system of claim 24, wherein the switch is configured to provide voice calls over a packet-switched data network.

26. The system of claim 23, wherein the calling party information includes a calling number and the called party information includes a called number, and wherein the means for looking up the network address comprises means for querying a calling name database for a name associated with the called number.

27. The system of claim 23, wherein the means for looking up a network address comprises means for looking up the called party number in a database to determine an IP address associated with the called party number.

28. The system of claim 23, wherein the calling party information includes an IP address associated with a calling party and the called party information includes an IP address associated with a called party.

29. The system of claim 28, wherein the means for looking up a network address comprises means for looking up the IP address associated with the called party in a database to determine a second IP address associated with the IP address associated with the called party.

30. The system of claim 23, further comprising:
means for storing in a subscriber profile at least one record correlating a calling number with a particular user;
means for checking the subscriber profile to identify a record corresponding to the calling party information; and
means for including at least a portion of the identified record in the notification message.

31. The system of claim 30, further comprising:
means for storing in a recipient profile at least one record correlating the particular user with a default reach number;
means for checking the recipient profile to identify a second record corresponding to the particular user; and
means for including at least a portion of the second identified record in the notification message.

32. The system of claim 31, further comprising:
means for storing in a persona profile at least one record correlating the particular user with a plurality of reach numbers, said plurality of reach numbers categorized according to a plurality of roles defined by the particular user;
means for checking the persona profile to identify a third record corresponding to the particular user; and
means for including at least a portion of the third identified record in the notification message.

33. The system of claim 30, further comprising:
means for storing in a persona profile at least one record correlating the particular user with a plurality of reach numbers, said plurality of reach numbers categorized according to a plurality of roles defined by the particular user;
means for checking the persona profile to identify a second record corresponding to the particular user; and
means for including at least a portion of the second identified record in the notification message.

34. The system of claim 30, further comprising:
means for receiving a registration information from a communications device, wherein said registration information comprises an identity and a current reach number associated with a user;
means for storing the registration information in a record in a presence profile;
checking the presence profile to identify a second record corresponding to the particular user; and
means for including at least a portion of the second identified record in the notification message.

35. The system of claim 23, further comprising means for providing an alert message to notify any of the potential call recipients that the call has been received, wherein said alert message includes at least a portion of the calling party information and at least a portion of the intended recipient information.

36. A computer memory storing processor executable logic for performing a method, the method comprising:
receiving a communication notification message at a network address associated with a calling number and with a called number, the communication notification message indicating that an incoming communication is being processed from the calling number for receipt at the called number;
causing display of an intended recipient of the incoming communication that is associated with the calling number and with the called number, the intended recipient being one of a plurality of potential recipients associated with the called number; and
causing display of a processing option for the incoming communication, the processing option redirecting the incoming communication from a party receiving the communication notification message to another party.

37. The computer memory according to claim 36, wherein causing display of the processing option comprises at least one of i) audibly alerting and ii) visually alerting to indicate that the incoming communication is being processed.

38. The computer memory according to claim 36, wherein causing display of the processing option comprises at least one of i) including an Internet Protocol address and ii) including the calling number.

39. The computer memory according to claim 36, wherein the processing option comprises at least one of i) an option to connect the incoming communication to voice mail and ii) an option to locate an intended recipient.

40. The computer memory according to claim 36, wherein the processing option comprises an option to redirect the incoming communication to another destination.

41. The computer memory according to claim 36, wherein the communication is a call, and wherein causing display of the processing option comprises visually alerting to indicate that the incoming call is being processed, and wherein the processing option comprises at least one of i) an option to connect the incoming call to voice mail, ii) an option to hold the incoming call for a predetermined time, iii) an option to locate an intended recipient, and iv) an option to redirect the incoming call to another destination.

* * * * *